United States Patent

[11] 3,612,807

| | | | | |
|---|---|---|---|---|
| [72] | Inventors | Adrianus Christinus Henricus Jozef Liefkens;<br>Wilhelmus Gerardus Essers, both of Emmasingel, Eindhoven, Netherlands | [51] | Int. Cl. ............................................................... B23k 9/00 |
| [21] | Appl. No. | 889,025 | [50] | Field of Search ........................................... 219/74, 75, 121, 121 P, 130 |
| [22] | Filed | Dec. 30, 1969 | | |
| [45] | Patented | Oct. 12, 1971 | [56] | References Cited |
| [73] | Assignee | U.S. Philips Corporation<br>New York, N.Y. | | UNITED STATES PATENTS |
| [32] | Priority | Jan. 3, 1969, Apr. 4, 1969 | 3,064,114 11/1962 Cresswell et al. ............... 219/74 |
| [33] | | Netherlands | 3,484,575 12/1969 Cunningham ................. 219/74 |
| [31] | | 6900167 and 6905350 | *Primary Examiner*—J. V. Truhe<br>*Assistant Examiner*—C. L. Albritton<br>*Attorney*—Frank R. Trifari |

[54] METHOD OF AND DEVICE FOR PLASMA ARC WELDING
17 Claims, 3 Drawing Figs.

[52] U.S. Cl. ....................................................... 219/121 P, 219/75, 219/130

ABSTRACT: A method and apparatus for plasma arc welding in which an electrically conductive or nonconductive filler wire is fed axially into the plasma arc.

METHOD OF AND DEVICE FOR PLASMA ARC WELDING

The invention relates to a method of and a device for plasma welding.

As is known plasma arc welding is a method of electrical arc welding in a protective gas wherein an arc is maintained between a workpiece a nonconsumable electrode, of a high melting point metal such as tungsten, the plasma of the arc being passed through a nozzle.

In this manner a highly constricted arc of approximately cylindrical cross section is formed which has a considerably higher temperature than the spread arc known as "argonarc" which has a more conical shape and which is obtained in accordance with the prior procedure where such a nozzle is not used.

Plasma arc welding and the associated equipment are described in the book "Plasma Arc Metalworking Processes," by Robert L. O'Brien published by the American Welding Society.

In the known manner of plasma welding the material to be deposited and having the form of an electrically nonconductive wire, called the filler wire, is fed laterally into the arc plasma.

This manner of welding has certain advantages, penetration of the workpiece upon satisfactory wetting of the metal can be limited and spattering of molten metal only occurs to a very small extent. However, the known method of plasma arc welding has also certain drawbacks. One drawback is that turbulences occur in the protective gas due to the filler wire being fed laterally, so that air is drawn in by this gas. This is detrimental for an effective gas protection. A further drawback during lateral feeding is that the filler wire is exposed to the energy of the arc only over a length which is approximately equal to half the diameter of the plasma arc. This causes a limitation of the feeding rate of the filler wire.

An object of the present invention is to obtain a method of plasma arc welding which does not have the above drawbacks. The invention relates to a method of plasma arc welding wherein an arc is maintained in a protective gas between a nonconsumable electrode and a workpiece and wherein the plasma arc is contracted by a nozzle provided between the electrode and the workpiece and wherein a wire for feeding welding material, filler wire, is caused to melt in the arc plasma, characterized in that the filler wire is fed axially into the plasma arc.

Due to the axial feeding, the wire is in contact with the plasma arc over a greater length as compared with lateral feeding. As a result metal can be supplied and deposited more quickly and hence welding can take place at a quicker rate while maintaining the satisfactory properties of plasma welding, namely, only slight penetration of the work piece and satisfactory wetting of the weld. Gas turbulences, which are brought about in the protective gas when filler wire is laterally introduced, and which influence the gas protection of the weld detrimentally, do not occur in the method according to the invention. In this connection plasma welding is also understood to be the deposition of material in a mold.

According to an embodiment of the invention, the filler wire is fed axially by using a tubular electrode and by feeding the wire electrically insulated through this electrode. (Fig. 1).

According to a further embodiment of the invention the electrode is placed outside the centerline of the nozzle. The plasma arc in the space between electrode and nozzle is then bent towards this center line. The filler wire can now be introduced axially into the arc plasma along the electrode and through the nozzle (Fig. 2).

When carrying out the method it is possible to supply gas which may differ in composition from the plasma gas around the nozzle as is common practice in plasma arc welding, so as to obtain an efficient protection of the molten metal. In addition the arc constriction obtained by using the nozzle is supported by such a stream of gas.

To increase the deposition rate of the welding material it is possible to arrange a plurality of electrodes in the nozzle and to maintain a plurality of arcs simultaneously through separate plasma apertures and to axially feed and deposit wire of welding material into the plasma of each of these arcs. This step is particularly advantageous when providing facings of coatings and depositing material in a mold.

Furthermore, the invention relates to a device for performing the method of plasma arc welding according to the invention while employing a nonconsumable electrode and a plasma nozzle, and is characterized in that the center line of the electrode coincides with the centerline of the nozzle, the electrode being provided with an axial bore having an electrically insulating lining and means being provided for feeding filler wire through this bore.

Furthermore, the invention relates to a device for plasma arc welding by means of the method according to the invention while employing a nonconsumable electrode and a plasma nozzle, and is characterized in that the electrode is placed outside the centerline of the plasma aperture of the nozzle, means being provided for feeding filler wire freely along the electrode through the center of the aperture in the nozzle. A particular advantage of feeding wire axially is that the devices can be constructed in a more compact form than is the case when feeding wire laterally.

In the devices for plasma arc welding according to the invention known provisions may be made on the electrode and the plasma nozzle, for example, water cooling. As is known it is alternatively possible for separate apertures to be provided in the nozzle next to the plasma aperture. The shape of the cross section of the arc plasma can then be influenced by plasma gas flowing out of these apertures. This can alternatively be effected by the shape of the plasma aperture. As is already known an extra supply for gas may be present around the nozzle so as to protect the weld.

In the device according to the invention in which the electrode is placed outside the centerline of the plasma aperture, it may be important that means are provided for adjusting the distance between the electrode and the plasma aperture of the nozzle. For the conventional diameters of the electrode, the nozzle and the filler wire, an adjusting possibility over distances of a few millimeters is sufficient.

According to a preferred embodiment of the invention the electrodes are formed from satisfactory heat-conducting metal, for example, copper, so as to obtain a satisfactory cooling, and the end to be loaded by the arc is formed from high melting point metal. The satisfactory heat-conducting part of the electrode, which might alternatively be referred to as the electrode holder, may furthermore be provided with means for water cooling.

The high melting point part forming the actual electrode may have the shape of a tube or a pin in the above-described devices and may be connected to the holder in a satisfactorily conducting manner. A sufficient electric and thermal contact between the parts may be established not only be welding or soldering, but also by a screwed or clamped connection.

As is common practice, the nozzle may be provided with means for water cooling. The plasma aperture in the nozzle generally has the shape of a cylinder having a diameter of from 0.5 to 1 cm. and a height of approximately 0.5 cm. During operation the small surface of the wall of this aperture is intensively exposed to the heat from the arc plasma so that damage may occur in spite of the use of cooling. In connection therewith it is advantageous to provide the plasma aperture and possibly further apertures for the passage of gas in a separate nipple which is secured in the nozzle as by means of a screwed connection.

To increase the capacity of deposition of welding material, the devices according to the invention may be provided with a plurality of electrodes corresponding to separate plasma apertures in the nozzle. In the embodiment of the device employing a tubular electrode or electrode holder these are provided with an electrically insulating lining of high-melting point material which is satisfactorily resistant to fluctuations in temperature. Quartz and aluminum oxide are particularly suitable for this purpose.

The arc may be started with the aid of a high-frequency spark discharge between electrode and workpiece or by means of an auxiliary discharge between the electrode and the inner side of the nozzle. The arc is maintained in a nonoxidizing gas. In practice inert gases such as argon and helium or mixtures thereof are used for this purpose in connection with the oxidizability of the high-melting point metals for the electrodes.

The choice of the gas for protection of the welding area is less limited. Dependent on the composition of the workpieces, not only the rare gases are suitable for this purpose, but also other gases used in welding in protective gas for example, $CO_2$ and gas mixtures like 95% A.+5% $O_2$ 90% A. +10% He, 80% A. +5% $O_2$+15% $CO_2$ and 89% A.+6%$CO_2$+5%$O_2$.

In order that the invention may be readily carried into effect, a few embodiments thereof will now be described in detail by way of example with reference to the accompanying diagrammatic drawings which show two devices for plasma arc welding according to the invention.

FIG. 1 shows a cross-sectional elevation view of the invention;

copper holder 18 provided with an insulating lining 19 of aluminum oxide. A tungsten electrode pin 20 is secured to this holder. The other parts of the arrangement which completely correspond to those of Fig. 1 have the same reference numerals as those in that Figure.

The arc maintained between the electrode pin 20 and the workpiece 12 comprises a conical part 21 which merges into a cylindrical part 22. The filler wire 3 may in this case be fed axially to the arc plasma freely along the electrode pin 20.

The invention will now further be described with reference to the results of a few experiments. In all cases the plasma aperture in the nozzle has the shape of a cylinder having a diameter of 7 mm. and a height of 5 mm. The outlet aperture of the envelope for the supply of protective has was 50 mm. The outlet aperture of the envelope for The electrode was always connected to the negative terminal of a direct current source. In so far as welding was performed with a device according to Fig. 2 of the drawing, the distance between the center line of the electrode and that of the nozzle was 5 mm.

The other circumstances and data are summarized in the following table.

TABLE

| | Example | | | | |
|---|---|---|---|---|---|
| | 1 | 2 | 3 | 4 | 5 |
| Composition of workpiece | St 37 | St 37 | St 37 | 18 Cr, 8 Ni, 74 Fe | Tungsten. |
| Thickness of workpiece in mm | 13 | 10 | 4 | 2 | 1.5. |
| Device | Fig. 2 | Fig. 2 | Fig. 1 | Fig. 2 | Fig. 2. |
| Type of weld | Facing | V 60° | V 60° | Closed I | Facing. |
| Composition of wire | 1.6 Mn, 0.8 Si, remainder Fe | 1.6 Mn, 0.8 Si, remainder Fe | Core wire: 1.6 Mn, 0.8 Si, 2.6 $CaCO_3$, 0.1 $CaF_2$, remainder Fe. | 18 Cr, 8 Ni, 74 Fe | Molybdenum. |
| Wire diameter in mm | 0.9 | 0.9 | 1.6 | 0.8 | 0.5. |
| Plasma gas | A | A | A | A | A. |
| Plasma supply in l./min. | 6 | 6 | 6 | 6 | 6. |
| Protective gas | 89A, 6$CO_2$, 5$O_2$ | 89A, 6$CO_2$, 5$O_2$ | $CO_2$ | 90A, 10$H_2$ | He. |
| Supply in l./min. | 30 | 30 | 25 | 30 | 30. |
| Welding current in amps | 200 | 200 | 190 | 110 | 170. |
| Welding voltage in volts | 27 | 25 | 33 | 23 | 25. |
| Number of welding runs | 1 | 3 | 1 | 1 | 1. |
| Welding travel speed in cm./min. | 25 | 20 | 20 | 30 | 20. |
| Rate of deposition welding wire in g./min. | 38 | 21 | 30 | 16 | 11.5. |
| Penetration in mm | 0.1 | 0.5 | 0.5 | 1 | 0.1. |

Figure 1:
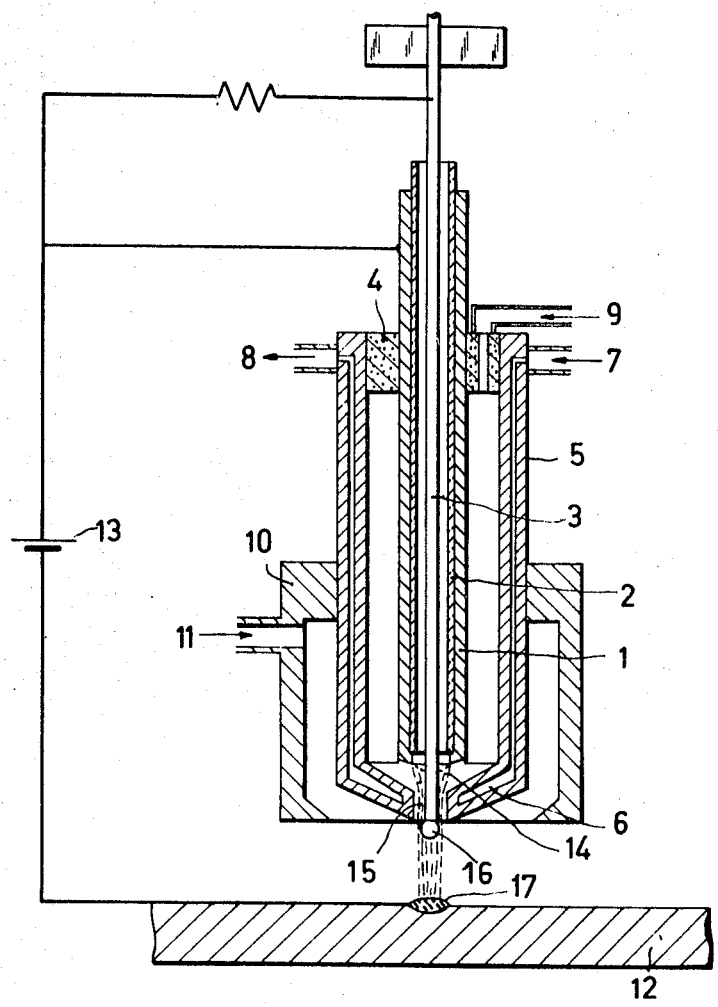

In FIG. 1, the reference numeral 1, denotes a nonconsumable tubular electrode which is provided with an electrically insulating lining 2 of quartz. Filler wire 3 may be passed through this electrode. Electrode 1 is mounted in the nozzle 5 by means of the insulation piece 4. The nozzle is provided with a cavity 6 for water cooling and a supply 7 and a drain 8 for cooling water. Furthermore a supply 9 for the plasma gas is provided on the nozzle 5.

Furthermore a cylindrical housing 10 having a supply 11 for protective gas surrounding the nozzle. The assembly is arranged over the workpiece 12 and can be moved over the surface to be welded. The workpiece 12 and the electrode 1 are connected to the current source 13. The electrode is then preferably connected to the negative terminal.

An arc discharge, which is maintained by the current source 13, can be started between the electrode 1 and the workpiece 12 by means of a high-frequency discharge. The plasma arc 14 is constricted to an approximately cylindrical shape by the aperture 15. The filler wire 3 is exposed to the arc over a relatively large length. The reference numeral 16 in the figure denotes a molten drop of welding material formed on the end of the filler wire 3, while the weld obtained is denoted by the reference numeral 17.

Figure 2:
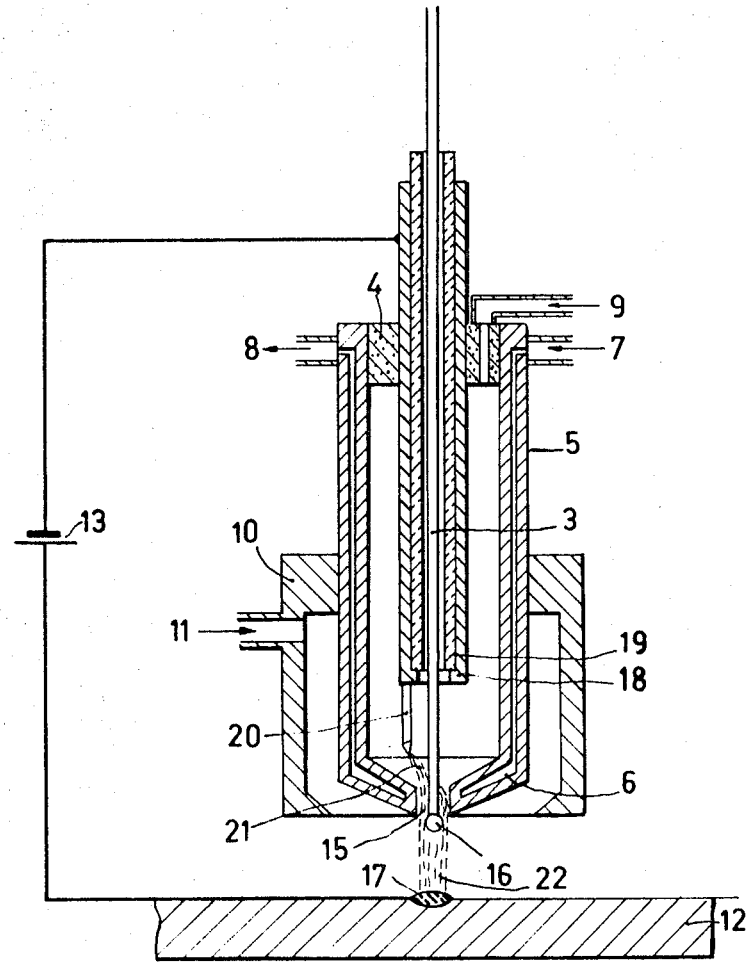
FIG. 2 shows a similar view of an embodiment of Fig. 1.

Fig. 2 shows a second embodiment of a device for plasma welding according to the invention, which is only distinguished from the device according to FIG. 1 by its deviating electrode shape. This electrode is built up from a tubular In accordance with the above examples, a satisfactory penetration and a good appearance of the weld was always obtained. To illustrate the improvement which is achieved according to the invention, it is to be noted that the rates of deposition of the metal was 12 and 7 grams per minute, respectively, upon feeding the wire laterally into the arc plasma under other wise equal circumstances as those in accordance with the examples 1 and 5. It is apparent therefrom that according to the invention more than 200 percent and approximately 65 more metal were deposited per minute in the said cases.

Figure 3:
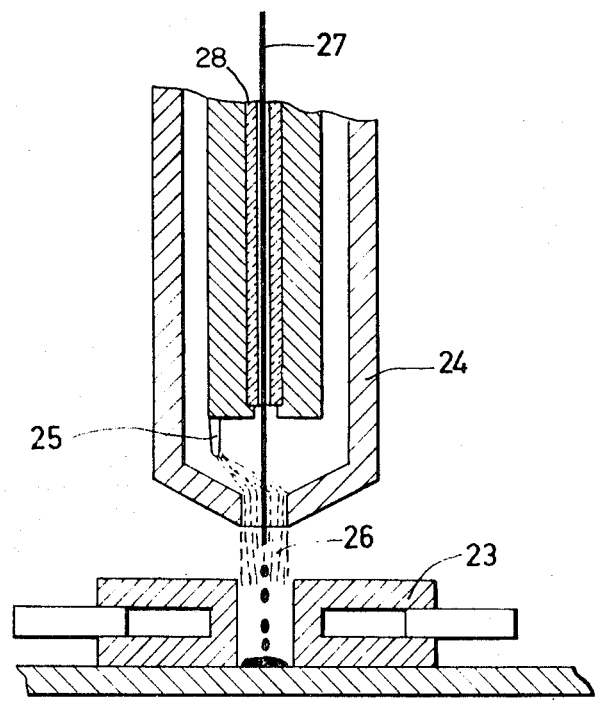
FIG. 3 shows a similar view of a third embodiment of the invention.

The invention may alternatively be used for the manufacture of castings by depositing the wire-shaped material fed to the arc in a mold. To this end a water-cooled cylindrical mold 23 of copper having an inner diameter of 9 mm. and a height of 15 mm., which for example is diagrammatically shown in a cross section in Fig. 3, is arranged at a distance of 10 mm. under the nozzle 24 of a device according to Fig. 2.

An arc 26 is maintained between the tungsten electrode 25 and the mold 23 in an argon stream of 6 liters per minute, while helium at a supply rate of 30 liters per minute is led around the arc as a further gas protection. (not shown in the figure). A tungsten wire 27 of 1 mm. thick is fed axially through insulated liner 28 of the electrode to the arc plasma. At a current of 175 amps and an arc voltage of 33 Volts, 35 grams of tungsten were deposited per minute in the mold 23 so that a homogenous, compact and oxide free tungsten casting was obtained.

In the above-described embodiments of the method and device according to the invention an electrically nonconductive filler wire is used. In these cases the filler wire is passed through the plasma arc which is maintained between the nonconsumable electrode and the workpiece. The energy required for consuming the filler wire is completely supplied by this arc.

It has been found that certain advantages are obtained in a special embodiment of the method according to the invention in which an electrically conductive filler wire is used. To this end the filler wire is also connected to a current source. A separate current source may be used for this purpose. The filler wire may alternatively be connected to the current source by which the arc is maintained between nonconsumable electrode and workpiece; in this case a resistor should be incorporated in the circuit so as to limit the current. The connection of filler wire and nonconsumable electrode should be such that the electric current flows in the same direction through both wire and electrode. However, electrical isolation of the filler wire is in certain cases not always necessary.

In the embodiment employing a conductive filler wire, the arc is found to concentrate to a still greater extent around the filler wire than in the embodiment employing a nonconductive filler wire, or in other words an additional constriction of the arc plasma occurs. As a result the filler wire is always present on the axis of the arc. Consequently in the method employing a conductive filler wire the transfer of heat from the arc to the filler wire is still better than in the embodiment using a nonconductive filler wire.

The method using a conductive filler wire may be performed with the devices shown in FIGS. 1, 2 and 3 in which means for the supply of current to the filler wire must then be present. This may be effected in the device of Fig. 2, for example, by incorporating a tubular contact member in the space between the filler wire 3 and the insulating lining 19, which member is connected through a resistor to current source 13.

Welding experiments in which plane facings were provided have shown that in the method employing conductive filler wire, the penetration depth of the weld into the workpiece and the width of the weld are mainly determined by the current intensity of the arc formed between the nonconsumable electrode and the workpiece. At a greater current intensity the width of the weld increases to a relatively greater extent than the penetration depth. The current through the filler wire especially exerts influence on the deposition rate. An increase of the current through the filler wire produces a narrower and higher bead when the current through the nonconsumable electrode is maintained constant. When increasing the current through the nonconsumable electrode, a wider and lower bead is obtained when the current through the filler wire is maintained constant. The current through the filler wire also exerts influence on the penetration depth, especially that in the center of the weld; this penetration depth increases at a greater current. The cross section of a plane facing generally has a greater penetration in its center than on the sides of the weld. The penetration depth in the workpiece and the deposition rate are, however, less dependent on each other than in conventional inert-gas metal-arc welding.

The method described covers a wide field of use. Thus, for example, joints were made between mild steel plates. In one case 10 mm. thick plates, and in the other case 2 mm. thick plates were welded together. In the first case the plates were pretreated to a V-seam of 60°. Welding took place at a root gap of 1 mm. Welding was effected with a device according to FIG. 2. An iron wire of 0.9 mm. diameter which comprised 1.6 percent by weight of manganum and 0.8 percent by weight of silicon was used as filler wire. The current intensity through the filler wire was 100 A., the current through the nonconsumable (tungsten) electrode was 195 A. The voltage between filler wire and workpiece was 20 V; the voltage between nonconsumable electrode and workpiece was 29 V. Filler wire and nonconsumable electrode were connected to the negative terminal of the current source, the workpiece was connected to the positive terminal of the current source. Argon in a quantity of 5 l/min. was used as plasma gas, and a mixture comprising 80 vol. percent A., 20 vol. percent $CO_2$ in a quantity of 35 l/min. was used as a further protective gas. The plasma aperture had a diameter of 7 mm., the welding travel speed was 20 cm./min., the rate of deposition was 78 g./min. The V-seam was filled in one run. The penetration was satisfactorily; the dilution with the plate material was small.

The 2 mm. thick plates were joined under substantially the same circumstances. The welding travel speed was in this case 153 cm./min. Welding took place in an I-seam at a root gap of 1.5 mm. Also in this case the dilution of the weld with the workpiece was small; approximately 14 percent of the total weld originated from the workpiece. No spatters at all occurred during welding. Metals having a high melting point such as molybdenum and tungsten may likewise be welded in accordance with this method.

We claim:

1. A method of plasma arc welding, including maintaining a plasma arc within a protective gas between a nonconsumable electrode and a workpiece, constricting the plasma arc by a nozzle aperture, feeding a filler wire axially through the nozzle aperture into the plasma arc and melting the filler wire in the plasma arc.

2. A method according to claim 1 wherein the electrode is tubular, and comprising the further step of electrically insulating said nozzle internally.

3. A method according to claim 1 further comprising placing at least the terminal part of the electrode outside the center line of the plasma aperture of the nozzle, establishing said plasma arc from said terminal part through said aperture to the workpiece, and feeding the filler wire axially into the plasma arc through the center of the plasma aperture.

4. A method according to claim 1 wherein an electrically conductive filler wire is used, comprising the further step of establishing a voltage potential between filler wire and workpiece.

5. A method according to claim 4 wherein said electrode through which the filler wire is fed is tubular.

6. A method according to claim 4 further comprising placing at least the terminal part of the electrode outside the centerline of the plasma aperture of the nozzle and establishing said arc from said terminal part through said aperture to the workpiece.

7. In a device for performing plasma arc welding on a workpiece, using a filler wire a nozzle with an aperture for constricting the plasma arc, a nonconsumable tubular electrode within said nozzle, the electrode having an axial bore and being placed on the center line of the plasma aperture of the nozzle, an electrically insulating lining disposed in said bore, and means for feeding filler wire through this bore and through the center of the plasma aperture of the nozzle, and means for maintaining the plasma arc between the electrode and the workpiece.

8. In a device for performing plasma arc welding with a filler wire on a workpiece, a nozzle with an aperture for constricting the plasma arc, a nonconsumable tubular electrode within the nozzle with at least the terminal part of the electrode outside the centerline of the nozzle aperture, the electrode having an axial bore, means for establishing the plasma arc from said terminal part through the aperture to the workpiece and means for feeding the filler wire axially into the arc through the center of said aperture.

9. In a device for performing plasma arc welding with an electrically conductive filler wire on a workpiece, a nozzle with an aperture for constricting the plasma arc, a nonconsumable, tubular electrode within the nozzle with at least the terminal part of the electrode outside the centerline of the nozzle aperture, the electrode having an axial bore, means for establishing the plasma arc from said terminal part though the aperture to the workpiece, means for feeding the filler wire axially into arc through the center of said aperture, and means for establishing a voltage potential between the filler wire and the workpiece.

10. In a device for performing plasma arc welding with a filler wire on a workpiece a nozzle with an aperture for constricting the plasma arc, a nonconsumable tubular electrode within said nozzle, the electrode having a bore through which the filler wire is axially feedable, means for feeding said filler wire through said bore, means for introducing plasma gas into the nozzle, and circuit means for establishing a plasma arc from the electrode through the aperture to the workpiece.

11. A device according to claim 10 further comprising means for adjusting the distance between the electrode and the plasma aperture in the nozzle.

12. A device according to claim 10 wherein the electrode comprises a portion made of high heat conducting metal and an end part of high melting point metal to be subjected to the filler wire.

13. A device according to claim 12 wherein the high melting point part of the electrode is annular.

14. A device according to claim 12 wherein the high melting point part of the electrode is pin shaped.

15. A device according to claim 10 wherein the nozzle comprises a detachable nipple in which plasma aperture is located 16. In a plasma arc welding apparatus for use with filler wire, plasma and protective gas supply and a workpiece, a tubular nozzle having a bore which defines an aperture at one end and a fluid duct within the nozzle walls for cooling same, a non-consumable tubular electrode having a bore and disposed within the bore of the nozzle with a first end of the electrode generally adjacent said nozzle aperture and a passageway for plasma gas defined between the electrode and bore walls of the nozzle, an electrically insulating lining within the bore of said electrode, a housing disposed about the nozzle and defining therewith a passage for protective gas flow adjacent the nozzle aperture, and means for establishing an electrical potential between said electrode and a workpiece, whereby a plasma arc is establishable through the aperture between said first end of the electrode and the workpiece, the filler wire being feedable axially through bore of the liner in the electrode into the plasma arc for deposition on the workpiece.

17. An apparatus according to claim 16 wherein said aperture has a diameter of about 7 mm. and a height of about 5 mm.